United States Patent [19]

Kitaoka et al.

[11] Patent Number: 4,857,417
[45] Date of Patent: Aug. 15, 1989

[54] COBALT-CONTAINING IRON OXIDE MAGNETIC PARTICLES AND METHOD FOR THE PREPARATION OF THE SAME

[75] Inventors: Susumu Kitaoka, Kyoto; Haruo Andoh, Takatsuki; Junichi Hirata, Otokuni, all of Japan

[73] Assignee: Hitachi Maxell, Ltd., Osaka, Japan

[21] Appl. No.: 141,073

[22] Filed: Jan. 5, 1988

Related U.S. Application Data

[60] Division of Ser. No. 858,575, Apr. 24, 1986, Pat. No. 4,741,921, which is a continuation of Ser. No. 739,765, Jun. 3, 1985, abandoned, which is a continuation of Ser. No. 650,993, Sep. 17, 1984, abandoned, which is a continuation of Ser. No. 427,531, Sep. 29, 1982, abandoned, which is a continuation of Ser. No. 898,127, Apr. 20, 1978, abandoned.

[30] Foreign Application Priority Data

| Apr. 20, 1977 | [JP] | Japan | 52-46046 |
| Apr. 20, 1977 | [JP] | Japan | 52-46045 |
| Apr. 20, 1977 | [JP] | Japan | 52-46047 |
| Jun. 23, 1977 | [JP] | Japan | 52-74993 |
| Jun. 23, 1977 | [JP] | Japan | 52-74991 |

[51] Int. Cl.⁴ .................................................. G11B 5/66
[52] U.S. Cl. .................................. 428/694; 427/127; 427/128; 428/403; 428/688; 428/900; 252/62.54; 252/62.56
[58] Field of Search ................. 427/127-132, 427/48; 428/900, 694, 688, 403; 252/62.54, 62.56

[56] References Cited

U.S. PATENT DOCUMENTS

| 3,725,126 | 4/1973 | Haller et al. |
| 4,002,804 | 1/1977 | Akashi et al. |
| 4,015,030 | 3/1977 | Sasazawa et al. |

FOREIGN PATENT DOCUMENTS

| 2634414 | 2/1977 | Fed. Rep. of Germany |
| 1437843 | 6/1976 | United Kingdom |

*Primary Examiner*—Bernard Pianalto
*Attorney, Agent, or Firm*—Birch, Stewart, Kolasch & Birch

[57] ABSTRACT

Cobalt-containing iron oxide magnetic particles having a high coercive force and a small surface electrical resistance which are useful as a recording element for a magnetic recording medium, and a method for the preparation of the same comprising reducing acicular $\gamma$-$Fe_2O_3$ particles in a reducing gas or liquid until the iron oxide reaches an intermediate oxidation state between $\gamma$-$Fe_2O_3$ and $Fe_3O_4$, dispersing the resulting iron oxide particles into an aqueous solution containing a cobalt salt and optionally a ferrous salt and an alkali of one equivalent or more to the metal salt(s), and heating the mixture at a temperature of higher than room temperature up to a boiling point of the mixture under an atmospheric condition such that the divalent iron is substantially not oxidized. The cobalt is thereby predominantly incorporated into the most outer layer of the acicular iron oxide particles.

22 Claims, 4 Drawing Sheets

COBALT-CONTAINING IRON OXIDE MAGNETIC PARTICLES AND METHOD FOR THE PREPARATION OF THE SAME

CROSS REFERENCE TO RELATED APPLICATIONS

This application is a Divisional of application Ser. No. 858,575 filed on Apr. 24, 1986 (now U.S. Pat. No. 4,741,921 which issued on May 3, 1988), which is a continuation of Ser. No. 739,765 filed June 3, 1985 (abandoned), which is a continuation of Ser. No. 650,993 filed Sept. 17, 1984 (abandoned), which is a continuation of Ser. No. 427,531 filed Sept. 29, 1982 (abandoned) which is a continuation of Ser. No. 898,127 filed Apr. 20, 1978 (abandoned).

TECHNICAL FIELD

The present invention relates to cobalt-containing iron oxide magnetic particles which are usefyl as a recording element for a magnetic recording medium, and a method for the preparation thereof.

BACKGROUND ART

Cobalt-containing iron oxide magnetic particles have a higher coercive force than that of the conventional iron oxide magnetic particles which do not contain cobalt, and have various advantages in that when they are used as a recording element for a magnetic recording medium, a high density recording can be achieved.

Various methods for preparation of the cobalt-containing iron oxide magnetic particles have been reported. For instance, a useful method is disclosed in Japanese Patent Publication No. 49475/1974. According to this method, the cobalt-containing iron oxide magnetic particles are prepared by dispersing iron oxide magnetic particles having a spinel structure, i.e. a ferrimagnetic $\gamma$-ferric oxide ($\gamma$-$Fe_2O_3$) or ferrosoferric oxide ($Fe_3O_4$), into a mixture of an aqueous solution containing an iron salt and a cobalt salt and an alkaline aqueous solution having a concentration of an alkali wherein at least cobalt hydroxide is precipitated, and introducing an oxidizing gas into the dispersion to cause an oxidation reaction in the dispersion, thereby epitaxially crystallizing cobalt-containing ferrite on the surface of the iron oxide magnetic particles. This method can give acicular cobalt-containing iron oxide magnetic particles having a high coercive force and a uniform particle size and having an excellent heat stability, e.g. excellent print through effect and less demagnetization due to heat.

However, according to the above method, since an oxidation reaction by an oxidizing gas proceeds during the epitaxial growth of the cobalt-containing iron oxide on the iron oxide magnetic particles, the layer of the cobalt-containing iron oxide formed on the iron oxide magnetic particles contains or no little divalent iron, and hence, even if $Fe_3O_4$ containing a large amount of a divalent iron is used, the obtained magnetic particles have some defects. For instance, when the magnetic particles thus obtained are used as a recording element for a magnetic recording medium (e.g. a magnetic tape), the obtained magnetic recording medium unfavorably has a comparatively large surface electrical resistance, and hence, easily charges with electricity. In order to eliminate the defects, a conductive material such as carbon black is added to the magnetic composition, but an increase of non-magnetic components unfavorably effects on the characteristics of the magnetic recording medium, for instance, decrease of the sensitivity thereof.

SUMMARY OF THE INVENTION

As a result of the present inventors' intensive studies, it has now been found that excellent cobalt-containing iron oxide magnetic particles having no defects such as mentioned above can be obtained by reducing acicular particles of $\gamma$-$Fe_2O_3$ in a reducing gas or liquid, until iron oxide reaches an intermediate oxidation state between $\gamma$-$Fe_2O_3$ and $Fe_3O_4$, and treating the acicular $\gamma$-$Fe_2O_3$ particles thus reduced with an aqueous solution of metal salts containing a cobalt salt and, optionally, a divalent iron salt and another metal salt (e.g. zinc salt) in the presence of an alkali of at least one equivalent to the metal salts under an atmosphere condition such that the divalent iron ion is substantially not oxidized, by which cobalt is predominantly contained in the most outer layer of the acicular ion oxide particles.

An object of the present invention is to provide improved cobalt-containing iron oxide magnetic particles useful as a recording element for a magnetic recording medium.

Another object of the invention is to provide a method for the preparation of improved cobalt-containing iron oxide magnetic particles by incorporating most of cobalt into the outermost layer of acicular ion oxide particles.

A further object of the invention is to provide an improved method for the preparation of the desired cobalt-containing iron oxide magnetic particles without including an oxidation reaction by an oxidizing gas.

These and other objects of the invention will be apparent from the following description and accompanying drawings in which;

DETAILED DESCRIPTION OF THE INVENTION

According to the present invention, the acicular $\gamma$-$Fe_2O_3$ particles are reduced in a reducing gas such as hydrogen gas or in a reducing liquid (e.g. in an aqueous solution containing a divalent iron ion), and thereby, there can be obtained magnetic particles, in the surface region of which a large amount of divalent iron is contained. The thus reduced acicular $\gamma$-$Fe_2O_3$ particles are treated with a solution containing a cobalt salt, optionally also containing a ferrous salt and another metal salt and an alkali, and thereby cobalt is predominantly incorporated into the outermost layer of the accicular iron oxide particles without an oxidation reaction by an oxidizing gas as in the method of the above-described Japanese patent. The cobalt-containing iron oxide magnetic particles thus obtained have a higher coercive force than the product obtained by the method of the above-described Japanese patent.

Moreover, the present invention utilizes the phenomenon that during the reduction of $\gamma$-$Fe_2O_3$ to $Fe_3O_4$, there occurs an intermediate oxidation state between $\gamma$-$Fe_2O_3$ and $Fe_3O_4$ which has a very high coercive force.

EMBODIMENT I

In one embodiment of the present invention, the process includes the steps of reducing acicular $\gamma$-$Fe_2O_3$ particles in a reducing gas (e.g. hydrogen gas) to give iron oxide particles which are in an intermediate oxidation state between $\gamma$-$Fe_2O_3$ and $Fe_3O_4$, dispersing the resulting reduced iron oxide particles into an aqueous solution of a metal salt, i.e. a solution containing a cobalt salt (e.g. cobalt sulfate, cobalt chloride, cobalt nitrate) and optionally a ferrous salt (e.g. ferrous sulfate, ferrous chloride, ferrous nitrate), and also containing an alkali (e.g. sodium hydroxide, potassium hydroxide, lithium hydroxide) of at least one equivalent to the above metal salt(s), and maintaining the mixture at a temperature of lower than the boiling point of the mixture under an atmosphere such that the divalent iron contained in the particles and in the solution is substantially not oxidized (this treatment may optionally be carried out under intercepting air or under nitrogen gas, or may be carried out in air, without blowing air into the reaction mixture, unless the oxidation of the divalent iron contained in the particles and in the solution is over about 10% at maximum), by which most of the cobalt is incorporated into the most outer layer of the acicular iron oxide particles. The treatment of the reduced iron oxide particles with the solution containing a cobalt salt and an alkali may be carried out by dispersing, firstly, the particles into an aqueous solution containing a cobalt salt and optionally a ferrous salt and adding thereto an aqueous solution of an alkali; or dispersing, firstly, the particles into an aqueous solution of an alkali and adding thereto an aqueous solution containing a cobalt salt and optionally a ferrous salt; or dispersing the particles into a mixture of an aqueous solution containing a cobalt salt and optionally a ferrous salt and an aqueous solution of an alkali.

In this method, a large amount of divalent iron is present in the surface region of the particles after reducing the acicular $\gamma$-$Fe_2O_3$ particles in a reducing gas. The resulting iron oxide magnetic particles are used in the subsequent treatment with a solution containing a cobalt salt and alkali. Moreover, the magnetic particles obtained by this method contain a large amount of divalent iron in the surface region of the particles and hence have a smaller surface electrical resistance than that of the magnetic particles which contain the same amount of the divalent iron within the whole particles (i.e. not only in the surface region but also in the particles). Thus, the magnetic particles of the invention can give a magnetic recording medium having a small surface electrical resistance.

The reduction of $\gamma$-$Fe_2O_3$ in the above method is preferably carried out until the atomomic ratio of the divalent iron to the trivalent iron ($De^{2+}Fe^{3+}$) contained in the iron oxide particles reaches a value in the range of 0.05 to 0.25.

When the magnetic particles having the above range of $Fe^{2+}/Fe^{3+}$ are used, the resulting cobalt-containing iron oxide magnetic particles have a further high coercive force.

The coercive force of the cobalt-containing iron oxide particles may also depend on other factors, such as the amount of an alkali and cobalt salt, treating temperature and treating period of time, etc.

The amount of the alkali should be at least one equivalent to the metal salt. When the amount of the alkali is smaller than one equivalent, the cobalt-containing iron oxide layer is not suitably formed on the iron oxide particles and hence the coercive force of the resulting magnetic particles is not sufficiently increased.

The treating temperature is usually higher than room temperature. When the temperature is higher, the speed of forming the cobalt-containing iron oxide layer is promoted, and hence, it is preferable to perform the treatment at as high a temperature as possible up to the boiling point of the reaction mixture.

EMBODIMENT II

In another embodiment of the present invention, the acicular $\gamma$-$Fe_2O_3$ particles may be reduced in a reducing liquid instead of treating by a reducing gas. That is, the acicular $\gamma$-$Fe_2O_3$ particles are treated in the same solution system as the subsequent treatment with a solution containing a cobalt salt and alkali.

According to this embodiment, the acicular $\gamma$-$Fe_2O_3$ particles are dispersed into a solution containing a cobalt salt (e.g. cobalt sulfate, cobalt chloride, cobalt nitrate) and a ferrous salt (e.g. ferrous sulfate, ferrous chloride, ferrous nitrate), and also containing an alkali (e.g. sodium hydroxide, potassium hydroxide, lithium hydroxide) of at least one equivalent to the metal salts, and maintaining the mixture at a temperature up to the boiling point of the mixture under an atmosphere such that the divalent iron contained in the solution is substantially not oxidized as in the above-described first embodiment, by which most of the cobalt is incorporated into the most outer layer of the iron oxide particles to give ferrimagnetic particles having excellent properties. The treatment of the acicular $\gamma$-$Fe_2O_3$ particles with the solution containing a cobalt, a ferrous salt and an alkali may be carried out by dispersing, firstly, the particles into an aqueous solution containing a cobalt salt and a ferrous salt and adding thereto an aqueous solution of an alkali; or dispersing, firstly, the particles into an aqueous solution of an alkali and adding thereto an aqueous solution containing a cobalt salt and a ferrous salt; or dispersing the particles into a mixture of an aqueous solution containing a cobalt salt and a ferrous salt and an aqueous solution of an alkali; or may be optionally carried out by treating, firstly, the particles with an aqueous solution containing a ferrous salt and thereafter with an aqueous solution containing a cobalt salt and an alkali.

According to this method, the ferrous ion is present in the outermost layer of the iron oxide particles without being substantially oxidized, and hence, even though $\gamma$-$Fe_2O_3$ particles having a low electrical conductivity are used, the magnetic particles thus obtained have an excellent electrical conductivity. The magnetic particles can give a magnetic recording medium having a small surface electrical resistance. The surface electrical resistance depends on the amount of the ferrous salt used in the reaction, and the larger the amount, the smaller the surface electrical resistance. The ferrous salt is usually used in an amount of about 0.05 mol or more per one mol of $\gamma$-$Fe_2O_3$.

Figure 1:
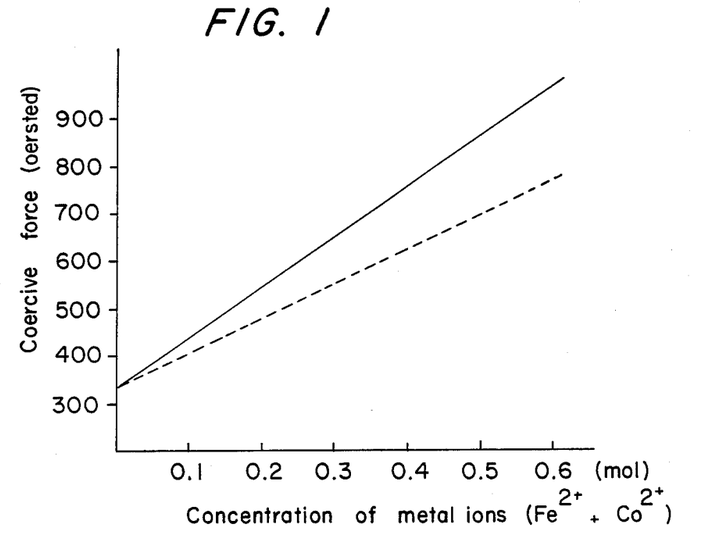
FIG. 1 is a graph showing the relationship between coercive force and the concentration of certain metal ions.

The coercive force of the magnetic particles obtained by the present invention depends on the amount of the cobalt salt and the ferrous salt, and the larger the amount, the larger the coercive force, as is shown in the accompanying FIG. 1 which shows the relation between the amount of iron and cobalt ions added to the $\gamma$-$Fe_2O_3$ particles and the coercive force of the produced cobalt-containing iron oxide magnetic particles. As is clear from FIG. 1, with increase of the concentration of the iron and cobalt ions, the coercive force of the magnetic particles increases in a straight line.

In FIG. 1, the solid line is of the cobalt-containing iron oxide magnetic particles prepared by the present invention under the conditions of acicular $\gamma$-$Fe_2O_3$ particles: the same as used in Example 2 (amount: 3 kg), atomic ratio of iron and cobalt: 2:1, amount of NaOH: 3 equivalent to total metal salts, treating temperature: 80° C. and treating period of time: 3 hours, and the dotted line is of the cobalt-containing iron oxide magnetic particles prepared in the same manner as above except that air was blown into the reaction mixture in an amount of 3 liters per minute to cause an oxidation reaction to proceed. As is clear from the comparison of both cases, the method of the present invention wherein oxidation reaction by an oxidizing gas does not substantially proceed can give the desired magnetic particles having a higher coercive force than that of the product prepared by utilizing an oxidation reaction in the same concentration of iron and cobalt ions.

The atomic ratio of the ferrous ion and cobalt ion may optionally vary, but is usually in the range of 0.5 to 10 ($Fe^{2}/Co^{2+}$).

The formation of the cobalt-containing iron oxide layer on the iron oxide particles may depend on the concentration of an alkali in the system and the treating temperature. When the amount of an alkali is equivalent or more to the metal salt contained in the system, the cobalt-containing crystals grow well on the iron oxide particles, and further, with rising of the treating temperature, the speed of forming of the crystals is promoted.

Figure 2:
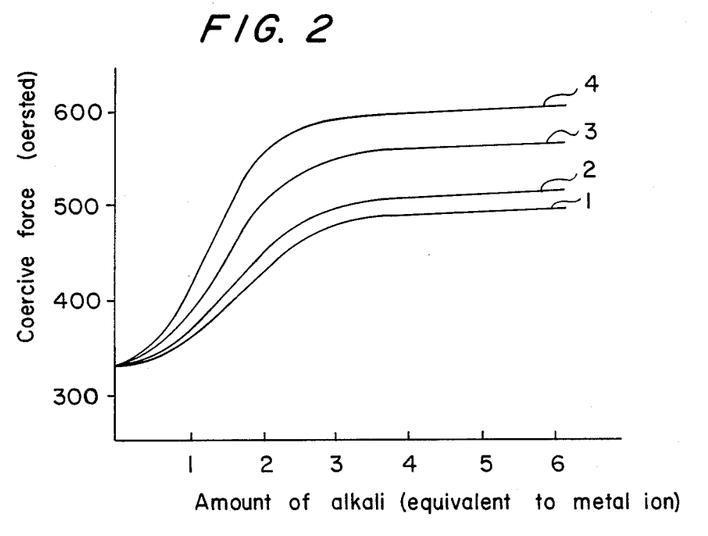
FIG. 2 is a graph showing the relationship between coercive force and the amount of alkali at different treating temperatures.

The accompanying FIG. 2 shows the relation between the coercive force of the cobalt-containing iron oxide magnetic particles prepared by the present invention and the amount of an alkali by the parameter of the treating temperatures, wherein the curves 1, 2, 3 and 4 represents curves wherein the treating temperatures are 20° C., 60° C., 80° C. and 100° C., respectively. In this test, the magnetic particles were prepared under the conditions of the amount of $\gamma$-$Fe_2O_3$ particles: 1 mol, amount of iron and cobalt ions: 0.21 mol, and treating period of time: 3 hours. As is clear from FIG. 2, with rising of the treating temperature and also with an increase of the amount of an alkali, the magnetic particles obtained have a higher coercive force.

Figure 3:
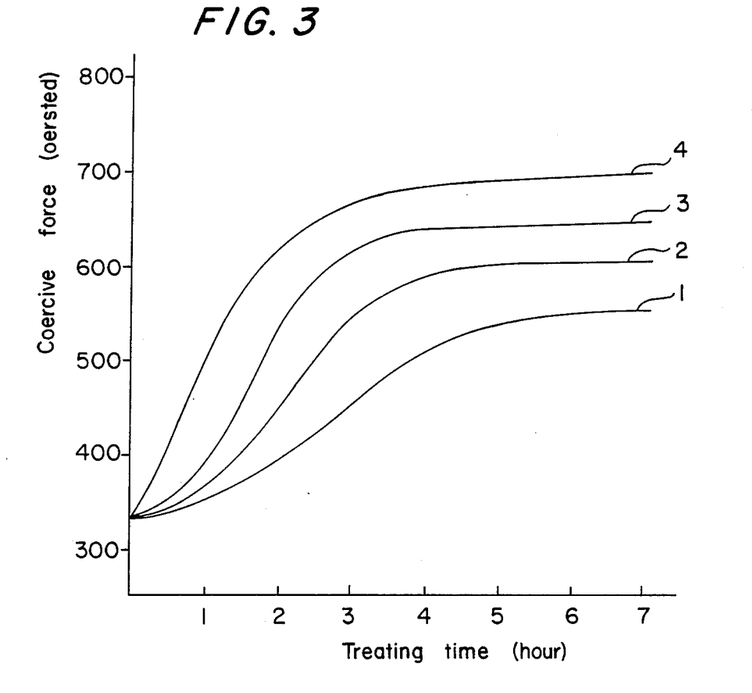
FIG. 3 is a graph showing the relationship between coercive force and the treating time at different temperatures.

In addition, the treating temperature effects the length necessary treating period. That is, with lowering of the treating temperature, the treating period of time necessary for obtaining the desired magnetic particles having excellent magnetic properties is prolonged. The accompanying FIG. 3 shows the relation between the coercive force of the cobalt-containing iron oxide magnetic particles prepared by the present invention and the reaction time at different treating temperatures, wherein the curves 1, 2, 3 and 4 represent curves wherein the treating temperature are 20° C., 60° C., 80° C. and 100° C., respectively. In this test, the magnetic particles were prepared under the conditions of the amount of iron and cobalt ions: 0.28 mol and amount of NaOH: 3 equivalents to total mtal ions. As is clear from FIG. 3, with lowering of the treating temperature, a longer perod of time for the treatment is required. Accordingly, it is preferable to conduct the present method at as high a temperature as possible.

The cobalt-containing iron oxide magnetic particles obtained by the present invention have the following various advantages and hence are very useful as a recording element for a magnetic recording medium.

(i) They have a high coercive force and hence a high density recording can be achieved.

(ii) They have a good electrical conductivity and hence the magnetic recording medium prepared therefrom has a small surface electrical resistance and has no problem of electric charge.

(iii) They have a good heat stability and hence there can be prepared a magnetic recording medium having less demagnetization due to heat and less print through.

(iv) The coercive force does almost not vary with the lapse of time.

(v) They have an excellent dispersibility in a magnetic composition.

(vi) They have an excellent orientation property.

(vii) They have a large maximum magnetization.

Thus, the cobalt-containing iron oxide magnetic particles prepared by the above method have excellent magnetic characteristics, but the present inventors have further found that when the cobalt-containing iron oxide magnetic particles are subjected to heat treatment (i.e. oxidation treatment) at a temperature of 60° to 200° C. under an oxidizing atmosphere, the coercive force of the particles is further increased and does not vary with the lapse of time.

As a result of the present inventors' study, it has been found that the variation of the coercive force of the magnetic particles may depend on the ratio of the divalent iron and trivalent iron ($Fe^{2+}/Fe^{3+}$), and when the magnetic particles having a ratio of $Fe^{2+}/Fe^{3+}$ of more than 0.10 are subjected to the heat treatment, the coercive force is increased and the high coercive force can stably be kept for a long period of time.

Figure 4:
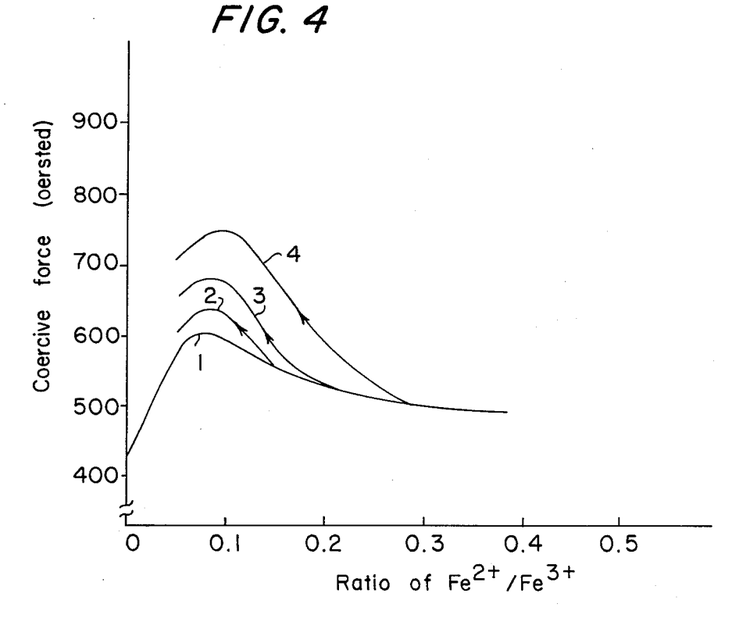
FIG. 4 is a graph showing the relationship between coercive force and the $Fe^{2+}/Fe^{3+}$ ratio of the particles.

The accompanying FIG. 4 shows the relation between the coercive force of the cobalt-containing iron oxide magnetic particles and the ratio of the divalent iron and trivalent iron ($Fe^{2+}/Fe^{3+}$) contained in the particles, wherein the curve 1 represents the magnetic particles before being subjected to heat treatment, and the curves 2, 3 and 4 represent the magnetic particles having a ratio of $Fe^{2+}/Fe^{3+}$ of 0.15, 0.2 and 0.3, respectively which were subjected to heat treatment at about 100° C. As is clear from FIG. 4, when the ratio of $Fe^{2+}/Fe^{3+}$ of the magnetic particles is at around 0.10, the coercive force becomes maximum, and the larger the ratio of $Fe^{2+}/Fe^{3+}$ in the magnetic particles to be heat-treated, the larger the variation of the coercive force. When the magnetic particles having a ratio of $Fe^{2+}/Fe^{3+}$ of larger than 0.10 are heated under an oxidizing atmosphere (e.g. in air), the divalent iron is oxidized to the trivalent iron and then the ratio is shifted to about 0.10, by which the coercive force is increased.

The cobalt-containing iron oxide magnetic particles containing the divalent iron have an excellent electic conductivity and an excellent dispersibility into a binder, and hence, they are suitable as a recording element for a magnetic recording medium. Since it is difficult to control the ratio of $Fe^{2+}/Fe^{3+}$ to about 0.10 only by the reduction of the starting $\gamma$-$Fe_2O_3$ particles in the reducing gas or liquid, it is convenient to reduce the starting $\gamma$-$Fe_2O_3$ so that the ratio of $Fe^{2+}/Fe^{3+}$ becomes larger than 0.10, and then to oxidize the obtained cobalt-containing iron oxide magnetic particles by subjecting to the heat treatment so that the ratio of $Fe^{2+}/Fe^{3+}$ is decreased to about 0.10, because the oxidation temperature and oxidation time in the heat treatment may be controlled comparatively easily and the desired magnetic particles can more easily be obtained.

Thus, the starting $\gamma$-$Fe_2O_3$ particles are excessively reduced, and the cobalt-containing iron oxide magnetic particles prepared from the excessively reduced $\gamma$-$Fe_2O_3$ particles are oxidized at the most suitable oxidation temperature and oxidation time in accordance with the ratio of $Fe^{2+}/Fe^{3+}$ of the cobalt-containing iron oxide magnetic particles, and thereby, the desired magnetic particles having the most suitable ratio of $Fe^{2+}/Fe^{3+}$ can be obtained. For instance, when the ratio of $Fe^{2+}/Fe^{3+}$ is larger, a higher oxidation temperature and longer oxidation time are adopted. But on the other hand, when the ratio of $Fe^{2}/Fe^{3+}$ is not so large, a lower oxidation temperature and shorter oxidation time are adopted. Particularly, when the oxidation treatment is carried out for a comparatively long time, the coercive force of the magnetic particles is irreversibly increased to give ferrimagnetic particles having a high coercive force which is stable for a long period of time.

The present inventors have further found that the coercive force of the cobalt-containing iron oxide magnetic particles still tends to vary with the lapse of time when the magnetic particles are kept at a comparatively high temperature (e.g. at 60° C.). As a result of the present inventors' further intensive study, it has been found that when the treatment of the reduced $\gamma$-$Fe_2O_3$ particles in a solution containing a cobalt salt and alkali is prolonged, the degree of variation of the coercive force of the magnetic particles with the lapse of time is significantly decreased. That is, when the time for treatment in a solution containing a cobalt salt and alkali is prolonged as long as about 1.5 fold or more of the time until the magnetization of the magnetic particles becomes maximum i.e. the magnetization of the magnetic particles reaches the turning point (point x) on the curves 1c, 2c and 3c in FIGS. 5 and 6 as mentioned hereinafter), the coercive force of the magnetic particles may be stabilized.

Figure 5:
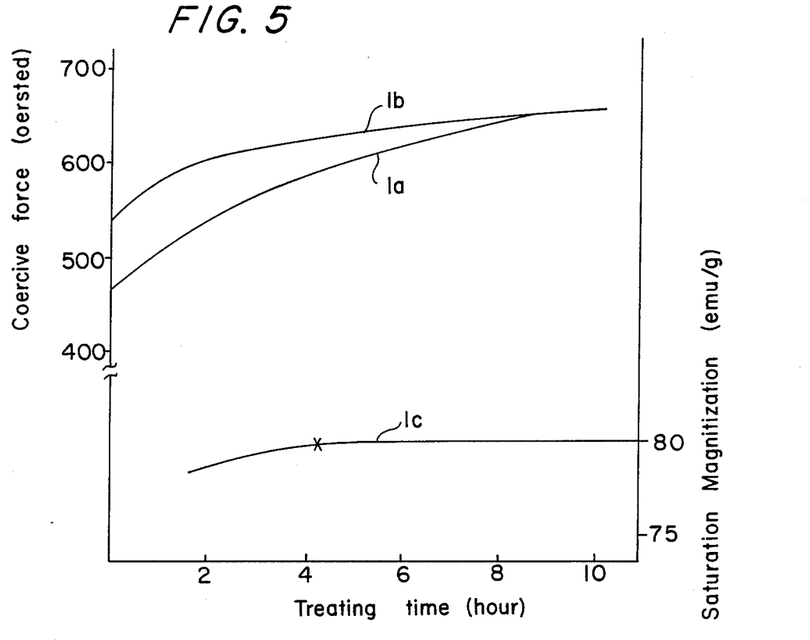
FIG. 5 is a graph showing the relationship between the treating time of the reduced iron oxide particles versus the coercive force and saturation magnetization of the resulting particles.

The accompanying FIG. 5 shows the relation between the treting time of the reduced $\gamma$-$Fe_2O_3$ particles versus the coercive force and saturation magnetization of the resulting cobalt-containing iron oxide magnetic particles, wherein the reduced $\gamma$-$Fe_2O_3$ particles ($Fe^{2+}/Fe^{3+}$: 0.139, 150 g) were treated with an aqueous solution (1 liter) containing a cobalt salt (0.053 mol) and an aqueous solution of NaOH (concentration: 0.43 mol/liter). In FIG. 5, the curve 1a is of the coercive force of the product immediately after being prepared, the curve 1b is of the coercive force of the product after aging it at 60° C. for 2 weeks, and the curve 1c shows the saturation magnetization. As is clear from FIG. 5, the coercive force of the finally obtained cobalt-containing iron oxide magnetic particles is increased with an increase of the treating time. Although the saturation magnetization is also increased with an increase in the treating time, it reaches a maximum within a comparatively short period of time. When the treatment within a time of shorter than 1.5 fold that of the time until the magnetization reaches maximum, the variation of the coercive force of the magnetic particles during aging thereof (i.e. the variation from the curve 1a to the curve 1b) is larger.

When the concentration of cobalt salt, the concentration of an alkali and the reaction temperature are changed in the above treatment, the value of coercive force of the obtained cobalt-containing iron oxide magnetic particles varies, but there is a similar relation between the treating time and the coercive force to that of the above-mentioned under any conditions. The accompanying FIG. 6 shows the relation between the treating versus the coercive force and saturation magnetization when the concentration of cobalt salt and alkali and the treating temperature are changed, wherein the curves 2a, 2b and 2c are of the case of the ratio of $Fe^{2+}/Fe^{3+}$: 0.20, concentration of cobalt salt: 0.07 mol/liter, concentration of alkali: 0.60 mol/liter and treating temperature: 90° C., and the curves 3a, 3b and 3c are of the case of the ratio of $Fe^{2+}/Fe^{3+}$: 0.10, concentration of cobalt salt: 0.04 mol/liter, concentration of alkali: 0.30 mol/liter and treating temperature: 80° C., and the suffix of these numbers is the same as in FIG. 5, i.e. "a" means the coercive force of the product immediately after being prepared, "b" means the coercive force of the product after aging it at 60° C. for 2 weeks in air at a relative humidity of 80%, and "c" means the saturation magnetization.

Figure 6:
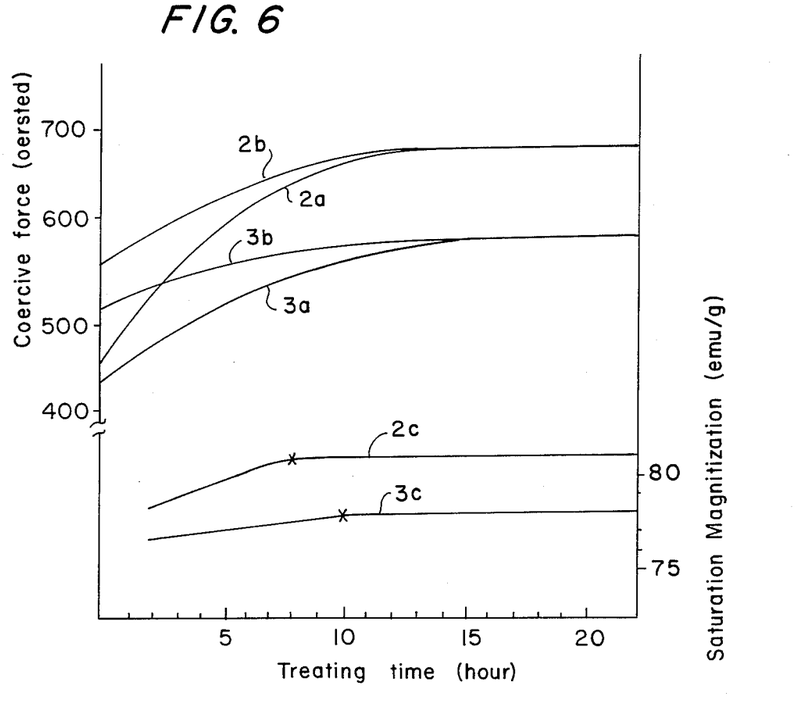
FIG. 6 is similar to FIG. 5 except that the concentration of the cobalt salt and alkali and the treating temperatures are changed.

As is clear from FIG. 6, even when the treating conditions are changed, there is a similar relation between the treating time versus the coercive force and saturation magnetization to that of the above-mentioned, and when the treating time is less than 1.5 fold that of the time until the magnetization reaches maximum, the coercive force of the resulting cobalt-containing iron oxide magnetic particles varies during aging.

It is not clear why the coercive force of the magnetic particles varies during aging when the magnetic particles are prepared by a shorter treating time, but by treating at a high temperature for a prolonged period of time, there can be obtained the desired cobalt-containing iron oxide magnetic particles having a stabilized coercive force.

Thus, the desired cobalt-containing iron oxide magnetic particles can be prepared by treating the reduced $\gamma$-$Fe_2O_3$ particles ($Fe^{2+}/Fe^{3+}$: 0.05–0.25) with an alkaline aqueous solution containing a cobalt salt for a period of time of about 1.5 fold or more, preferably 2 fold or more, that of the time until the magnetization reaches maximum (i.e. after the magnetization reached maximum, they are treated for an additional time of 0.5 fold or more, preferably 1 fold or more, of the time until the magnetization reaches maximum).

In order to give a product having suitable characteristics for magnetic recording or reproducing, the cobalt-containing iron oxide magnetic particles should have a particle size of 1$\mu$ or less, preferably 0.1 to 0.5$\mu$ and an acicular shape having an axis ratio (long axis/short axis) of 5 or more, preferably 5 to 20. Since the particle size and shape of the starting iron oxide particles are almost not changed during the treatment of the present invention, the starting iron oxide particles should have the same particle size and shape as mentioned above.

Moreover, in order to give the product having a high coercive force of 300 oersteds or more which is suitable for magnetic recording or reproducing, it is preferable to incorporate cobalt in an amount of 0.2% by weight or more, more preferably 0.5 to 10% by weight, based on the weight of the total metal atoms. In order to decrease the surface electrical resistance of the magnetic recording medium, the ferrous atom is preferably contained in the magnetic particles in an amount of 5% by weight or more, more preferably 10 to 20% by weight, based on the weight of the total metal atoms contained in the particles.

The present invention is illustrated by the following Examples, but is not limited thereto.

EXAMPLE 1

Acicular $\gamma$-$Fe_2O_3$ particles (coercive force (Hc): 330 oersteds, maximum magnetization ($\sigma s$): 74 emu/g, particle size: about 0.3$\mu$, axis ratio: about 10, $Fe^{2+}/Fe^{3+}$: less than 0.02) were treated in a stream of hydrogen gas at 230° C. for 3 hours to give iron oxide magnetic particles (Hc: 365 oersteds, $\sigma s$: 78 emu/g, $Fe^{2+}/Fe^{3+}$: 0.10). The iron oxide magnetic particles (3 kg) were dispersed well into an aqueous solution (10 liters) containing cobalt sulfate (1 mol) and ferrous sulfate (2 mol) in an open vessel and thereto was added an aqueous solution (10 liters) of NaOH (18 mol). The mixture was heated to 100° C. and was stirred at this temperature for 8 hours. The resulting magnetic particles were separated by filtration, washed well with water and dried. The cobalt-containing iron oxide magnetic particles thus obtained had Hc of 650 oersteds, $\sigma s$ of 80 emu/g and a ratio of $Fe^{2+}/Fe^{3+}$ of 0.15. According to a chemical analysis, the magnetic particles contained 1.96 atomic % of cobalt.

Figure 7:
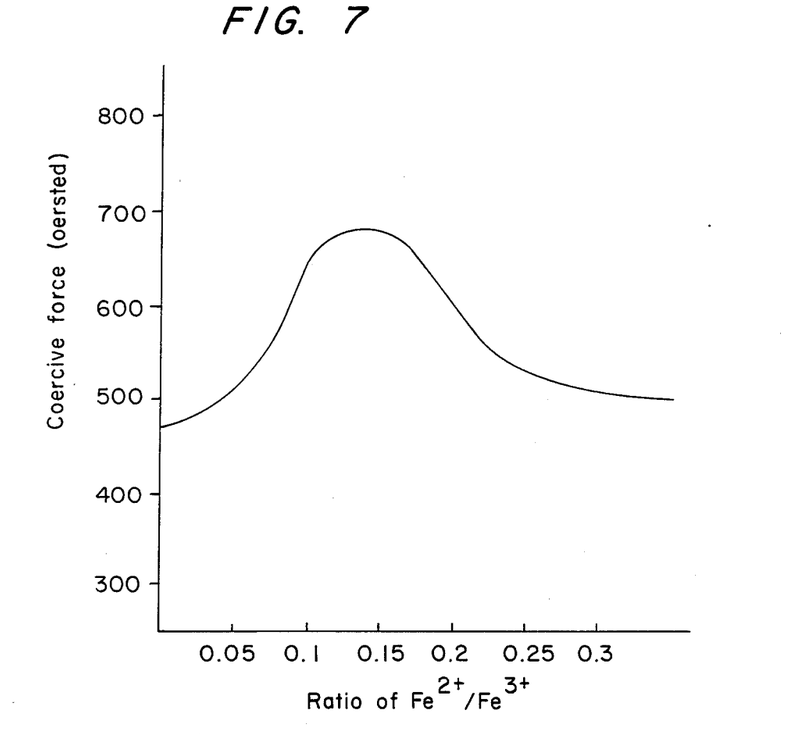
FIG. 7 is a graph showing the relationship between coercive force and the $Fe^{2+}/Fe^{3+}$ ratio of the starting magnetic particles.

In the same manner as described above except that the heating conditions in a hydrogen gas stream varied, iron oxide particles having various ratios of $Fe^{2+}/Fe^{3+}$ were prepared, and by using the iron oxide particles, various cobalt-containing iron oxide magnetic particles were prepared. The relation between the coercive force of the cobalt-containing iron oxide magnetic particles thus obtained and the ratio of $Fe^{2+}/Fe^{3+}$ in the iron oxide particles is shown in the accompanying FIG. 7. As is clear from FIG. 7, when the ratio of $Fe^{2+}/Fe^{3+}$ is in the range of 0.05 to 0.25, the cobalt-containing iron oxide magnetic particles have a high coercive force.

EXAMPLE 2

Acicular $\gamma$-$Fe_2O_3$ particles (particle size: about 0.3$\mu$, axis ratio: about 10, Hc: 330 oersteds, $\sigma s$: 74 emu/g, 3 kg) were dispersed well into an aqueous solution (10 liters) containing ferrous sulfate (2.8 mol) and cobalt sulfate (1.4 mol) under nitrogen gas in a closed vessel, and thereto was added an aqueous solution (10 liters) of NaOH (25.2 mol). The mixture was heated to 60° C. and stirred at this temperature for 6 hous. The resulting magnetic particles were separated by filtration, washed well with water and dried. The cobalt-containing iron oxide magnetic particles thus obtained had Hc of 560 oersteds, $\sigma s$ of 76.8 emu/g and a ratio of $Fe^{2+}/Fe^{3+}$ of 0.074. According to a chemical analysis, the magnetic particles contained 2.75 atomic % of cobalt.

EXAMPLE 3

The same acicular $\gamma$-$Fe_2O_3$ particles (3 kg) as used in Example 2 were dispersed well into an aqueous solution (10 liters) containing ferrous sulfate (3.8 mol) and cobalt sulfate (1.4 mol) in a closed vessel and thereto was added an aqueous solution (10 liters) of NaOH (3.12 mol). The mixture was heated to 80° C. and was stirred at this temperature for 6 hous. The resulting magnetic particles were separated by filtration, washed well and dried. The cobalt-containing iron oxide magnetic particles thus obtained had Hc of 600 oersteds, $\sigma s$ of 78.0 emu/g, a ratio of $Fe^{2+}/Fe^{3+}$ of 0.101 and contained 2.75 atomic % of cobalt.

EXAMPLE 4

The same acicular $\gamma$-$Fe_2O_3$ particles (3 kg) as used in Example 2 were dispersed well into an aqueous solution (10 liters) containing ferrous sulfate (3.8 mol) and cobalt sulfate (1.9 mol) in a closed vessel and thereto was added an aqueous solution (10 liters) of NaOH (34.2 mol). The mixture was heated to 100° C. and was stirred at this temperature for 3 hours. The resulting magnetic particles were separated by filtration, wshed with water and dried. The cobalt-containing iron oxide magnetic pargicles thus obtained had Hc of 640 oersteds, $\sigma s$ of 77.8 emu/g and a ratio of $Fe^{2+}/Fe^{3+}$ of 0.101 and contained 3.73 atomic % of cobalt.

REFERENCE EXAMPLE 1

In the same manner as described in Example 4 except that the dispersion containing $\gamma$-$Fe_2O_3$ particles was subjected to oxidation reaction by blowing therein air in an amount of 3 liters/minute with stirring for 6 hours while keeping the dispersion at 80° C., there were obtained cobalt-containing iron oxide magnetic particles having Hc of 560 oersteds, $\sigma s$ of 75 emu/g, a ratio of $Fe^{2+}/Fe^{3+}$ of 0.025 and containing 3.73 atomic % of cobalt.

REFERENCE EXAMPLE 2

In order to increase the ferrous content of the starting magnetic particles, the same $\gamma$-$Fe_2O_3$ particles as used in Example 2 were heated in a hydrogen gas stream at 300° C. for 3 hours. The resulting iron oxide particles thus reduced had a ratio of $Fe^{2+}/Fe^{3+}$ of 0.35. The magnetic particles thus obtained were treated in the same manner as in Reference Example 1. The cobalt-containing iron oxide magnetic particles thus obtained had Hc of 500 oersteds, $\sigma s$ of 86.0 emu/g, a ratio of $Fe^{2+}/Fe^{3+}$ of 0.340 and contained 3.73 atomic % of cobalt.

By using each cobalt-containing iron oxide magnetic particles obtained in the above Examples 1 to 4 and Reference Examples 1 and 2, magnetic compositions having the following components were prepared.

Magnetic particles: 75 part by weight

Vinyl chloride-vinyl acetate copolymer: 25 part by weight

Dioctyl phthalate: 5 part by weight

A mixed solvent of toluene and methyl isobutyl ketone (1:1): 200 part by weight

The magnetic compositions were each coated on a polyester film in a tickness of about 6$\mu$ (in dry state) and dried, and then, the coated film was slit in a fixed width to give magnetic tapes. On each magnetic tape, the surface electrical resistance and print through effect were tested. The results are shown in Table 1.

TABLE 1

| Example No. | Ratio of $Fe^{2+}/Fe^{3+}$ of the magnetic particles | Surface electrical resistance of magnetic tape ($\Omega \cdot cm$) | Print through effect (dB) |
| --- | --- | --- | --- |
| Ex. 1 | 0.150 | $10^8$ | 62.0 |
| Ex. 2 | 0.074 | $10^9$ | 62.5 |
| Ex. 3 | 0.101 | $10^8$ | 62.0 |
| Ex. 4 | 0.101 | $10^8$ | 63.0 |
| Ref. Ex. 1 | 0.025 | $10^{11}$ | 61.0 |
| Ref. Ex. 2 | 0.340 | $10^{10}$ | 58.0 |

As is clear from the above results, the magnetic tape prepared from the magnetic particles of the present invention had almost same print through effect and a very smaller surface electrical resistance in comparison with the products of Reference Examples. This may be owing to the fact that in the magnetic particles of the present invention, the divalent iron is largely present at the surface region of the particles, while the ratio of $Fe^{2+}/Fe^{3+}$ is comparatively small. Although the magnetic particles of Reference Examples had a larger ratio of $Fe^{2+}/Fe^{3+}$ than that of the present invention, the divalent iron is little present at the surface region of the particles, and hence, the magnetic tape prepared from the magnetic particles of Reference Examples may have a larger surface electrical resistance.

EXAMPLE 5

Acicular $\gamma$-$Fe_2O_3$ particles (Hc: 330 oersteds, $\sigma s$: 74 emu/g, particle size: about 0.3$\mu$, and axis ratio: about 8) were reduced by heating in a hydrogen gas stream at the temperature for the time as shown in the following Table 2 to give magnetic iron oxide particles having Hc, $\sigma s$ and $Fe^{2+}/Fe^{3+}$ as shown in Table 2.

TABLE 2

| Sample No. | Temperature (°C.) | Heating time (hour) | Hc (oersted) | $\sigma s$ (emu/g) | $Fe^{2+}/Fe^{3+}$ |
| --- | --- | --- | --- | --- | --- |
| 1 | 220 | 3 | 380 | 78.0 | 0.10 |
| 2 | 220 | 5 | 380 | 80.0 | 0.15 |
| 3 | 260 | 2 | 360 | 82.0 | 0.20 |
| 4 | 300 | 1 | 350 | 84.0 | 0.25 |
| 5 | 300 | 3 | 340 | 86.0 | 0.30 |

The magnetic particles (3 kg) thus obtained were dispersed into an aqueous solution (10 liters) containing cobalt surface (1 mol) and thereto was added an aqueous solution (10 liters) of NaOH (6 mol). The mixture was heated to 100° C. and was stirred at this temperature for 3 hours. The resulting magnetic particles were separated by filtration, washed well with water and dried. The cobalt-containing iron oxide magnetic particles thus obtained had Hc, $\sigma s$ and $Fe^{2+}/Fe^{3+}$ as shown in Table 3.

TABLE 3

| Sample No. | Hc (oersted) | $\sigma s$ (emu/g) | $Fe^{2+}/Fe^{3+}$ |
| --- | --- | --- | --- |
| 1 | 590 | 78.0 | 0.10 |
| 2 | 560 | 80.0 | 0.15 |
| 3 | 520 | 82.0 | 0.20 |
| 4 | 500 | 84.0 | 0.25 |
| 5 | 490 | 86.0 | 0.30 |

The cobalt-containing iron oxide magnetic particles were heated in air at the temperature and for the time as shown in the following Table 4 to give the magnetic particles having Hc, $\sigma s$ and $Fe^{2+}/Fe^{3+}$ as shown in Table 4.

TABLE 4

| Sample No. | Temperature (°C.) | Heating time (hour) | Hc (oersted) | $\sigma s$ (emu/g) | $Fe^{2+}/Fe^{3+}$ |
| --- | --- | --- | --- | --- | --- |
| 1 | 80 | 20 | 610 | 77.0 | 0.075 |
| 2 | 100 | 20 | 625 | 78.0 | 0.10 |
| 3 | 120 | 10 | 640 | 79.0 | 0.125 |
| 4 | 120 | 20 | 700 | 78.0 | 0.10 |
| 5 | 120 | 40 | 740 | 78.0 | 0.10 |

As is clear from the above results, according to the ferrous content of the particles, the oxidation treatment is performed, and thereby, there can easily be prepared cobalt-containing iron oxide magnetic particles having a high coercive force.

EXAMPLE 6

Acicular $\gamma$-$Fe_2O_3$ particles (Hc: 330 oersteds, $\sigma s$: 74.0 emu/g, average particle size: about 0.3$\mu$, axis ratio: about 8) were reduced by heating in a hydrogen gas stream at 230° C. for 3 hours to give iron oxide magnetic particles (Hc: 370 oersteds, $\sigma s$: 79.5 emu/g, $Fe^{2+}/Fe^{3+}$ range of 0.075 to 0.125: 0.139). The magnetic particles (3 kg) thus obtained were dispersed well into an aqueous solution (10 liters) containing cobalt sulfate (1.06 mol) in an open vessel and thereto was added an aqueous solution (10 liters) of NaOH (4.3 mol). The mixture was heated to 100° C. and was stirred at this temperature. During of this treatment, a sample of the magnetic particles was picked up at an interval of a fixed time, and the $\sigma s$ thereof was measured. When the mixture was treated for about 4 hours, the $\sigma s$ was 80.0 emu/g, and thereafter the $\sigma s$ did not increase. After the $\sigma s$ reached maximum, the mixture was further stirred for additional 6 hours, and then the magnetic particles were taken out, washed well with water and dried. The cobalt-containing iron oxide magnetic particles thus obtained had Hc of 670 oersteds, $\sigma s$ of 80.0 emu/g and a ratio of $Fe^{2+}/Fe^{3+}$ of 0.135 and contained 2.08 atomic % of cobalt.

The cobalt-containing iron oxide magnetic particles thus obtained were kept in air of a relative humidity of 80% at 60° C. for 2 weeks, and the coercive force thereof was measured. As a result, the coercive force did almost not vary.

Various magnetic particles having various $Fe^{2+}/Fe^{3+}$ were treated in the same manner as described above. When the relation between the coercive force of the resulting magnetic particles and the ratio of $Fe^{2+}/Fe^{3+}$ of the starting magnetic particles was shown in figure, a similar figure to the accompanying FIG. 7 was obtained. As is clear from the figure, when the ratio of $Fe^{2+}/Fe^{3+}$ is in the range of 0.05 to 0.25, there are obtained the desired cobalt-containing iron oxide magnetic particles having a high coercive force.

EXAMPLES 7 and 8

The same acicular $\gamma$-$Fe_2O_3$ particles as used in Example 6 were reduced in a hydrogen gas stream under the conditions as shown in the following Table 5 ti give iron oxide magnetic particles having various ratios of $Fe^{2+}/Fe^{3+}$.

TABLE 5

| Example No. | Temperature (°C.) | Heating time (°C.) | Magnetic particles after reduction | |
|---|---|---|---|---|
| | | | Hc (oersted) | $Fe^{2+}/Fe^{3+}$ |
| Ex. 7 | 220 | 3 | 360 | 0.10 |
| Ex. 8 | 240 | 3 | 360 | 0.20 |

The magnetic particles (3 kg) thus obtained were treated using an aqueous solution (10 liters) containing cobalt sulfate and an aqueous sodium hydroxide solution (10 liters) under the conditions as shown in the following Table 6 to give cobalt-containing iron oxide magnetic particles as shown in Table 6.

TABLE 6

| Example No. | Concentration of cobalt salt (mol/liter) | Concentration of alkali (mol/liter) | Treating temperature (°C.) | Time until $\sigma s$ reaches maximum (hour) | Treating time (hour) | Cobalt-containing magnetic particles | |
|---|---|---|---|---|---|---|---|
| | | | | | | Hc (oersted) | $\sigma s$ (emu/g) |
| Ex. 7 | 0.04 | 0.30 | 80 | 10 | 15 | 550 | 78.0 |
| Ex. 8 | 0.07 | 0.60 | 90 | 8 | 12 | 650 | 81.0 |

The cobalt-containing iron oxide magnetic particles thus obtained were kept in air of a relative humidity of 80% at 60° C. for 2 weeks, and thereafter, the coercive force of each magnetic particles was measured. As a result, the coercive force did almost not vary.

What is claimed is:

1. A method for preparing cobalt-containing iron oxide magnetic particles, which consists essentially of:
   reducing and dispersing acicular gamma-$Fe_2O_3$ particles in an aqueous solution containing a ferrous ssalt, a cobalt salt and an alkali of one equivalent to the cobalt and ferrous salts to raise the ratio of divalent iron to trivalent iron ($Fe^{2+}/Fe^{3+}$) until the $Fe^{2+}/Fe^{3+}$ ratio becomes about 0.074 to 0.101; and
   heating the mixture at a temperature higher than room temperature up to a boiling point of the mixture under an atmosphere such that the divalent iron is substantially not oxidized and thereby cobalt is predominantly incorporated into the outermost layer of the acicular iron oxide particles in an amount of 0.2% by weight or more based on the weight of the total metal.

2. A method according to claim 1, wherein the ferrous salt is used in an amount of about 0.1 mol or more per one mol of gamma-$Fe_2O_3$.

3. Cobalt-containing iron oxide magnetic particles prepared by the process of claim 1.

4. A method according to claim 1, wherein the reduced gamma-$Fe_2O_3$ particles have a $Fe^{2+}/Fe^{3+}$ ratio of about 0.074.

5. A method according to claim 1, wherein the reduced gamma-$Fe_2O_3$ particles have a $Fe^{2+}/Fe^{3+}$ ratio of about 0.101.

6. A method for preparing cobalt-containing iron oxide magnetic particles, comprising the steps of:
   reducing and dispersing acicular gamma-$Fe_2O_3$ particles having a particle size of 0.1 to 0.5 and an acicular shape having an axis ratio (long axis/short axis) of 5 to 20 in an aqueous solution containing a ferrous salt in an amount of about 0.05 mol or more per one mol of gamma-$Fe_2O_3$, acobalt salt and an alkali of at least one equivalent to the cobalt and ferrous salts to raise the ratio of divalent iron to rivalent iron ($Fe^{2+}/Fe^{3+}$) until the $Fe^{2+}/Fe^{3+}$ ratio becomes about 0.074 to 0.101; and
   heating the resulting mixture at a temperature up to the boiling point of the mixture under an atmosphere for a period of time of 1.5 fold or more of the time until magnetization reaches a maximum such that the divalent iron is substantially not oxidized and thereby the cobalt is predominantly incorporated into the outermost layer of the acicular iron oxide particles in an amount of 0.5 to 10% by weight or more based on the weight of the total metal atoms and the ferrous atom is contained in the magnetic particles and in an amount of 10% to 20% by weight based on the weight of the total metal atoms contained in the particles.

7. Cobalt-containing iron oxide magnetic particles prepared by the process of claim 6.

8. A method for preparing cobalt-containing iron oxide magnetic particles consisting essentially of the steps of:
   reducing and dispersing acicular gamma-$Fe_2O_3$ particles having a particle size of 0.1 to 0.5 and an acicular shape having an axis ratio (long axis/shor axis) of 5 to 20 in an aqueous solution containing a ferrous salt in an amount of 0.05 mol or more per one mol of gamma-$Fe_2O_3$, a cobalt salt and an alkali of at least one equivalent to the cobalt and ferrous salts to raise the ratio of divalent iron to trivalent iron ($Fe^{2+}/Fe^{3+}$) until the $Fe^{2+}/Fe^{3+}$ ratio becomes about 0.074 to 0.101; and
   heating the mixture at a temperature up to the boiling point of the mixture under an atmosphere for a period of time of 1.5 fold or more of the time until magnetization reaches a maximum such that the divalent iron is substantially not oxidized and thereby the cobalt is predominantly incorporated into the outermost layer of the acicular iron oxide particles in an amount of 0.5 to 10% by weight or more based on the weight of the total metal atoms and the ferrous atom is contained in the magnetic particles and in an amount of 10% to 20% by weight based on the weight of the total metal atoms contained in the particles.

9. The process of claim 8, wherein said reduced particles mixture is heated at a temperature up to the boiling point of the mixture for a period of time of 2 fold or more of the time until magnetization reaches a maximum.

10. Cobalt-containing iron oxide magnetic particles prepared by the process of claim 8. metal atoms contained in said particles to thereby obtain cobalt-containing acicular iron oxide magnetic particles having a ratio of divalent iron and trivalent iron ($Fe^{2+}/Fe^{3+}$) of 0.1 to 0.30;
   filtering the obtained cobalt-containing iron oxide magnetic particles out of said mixture; and
   subjecting the thus obtained cobalt-contining iron oxide particles to oxidation treatment under oxidizing atmosphere at a temperature of 60° to 200° C.

until the ratio of $Fe^{2+}/Fe^{3+}$ lowers from that of the cobalt-containing iron oxide particles in their previous un-oxidized state to about 0.075 to 0.125 thereby increasing the coercive force of the particles.

11. A method for preparing cobalt-containing iron oxide magnetic particles comprising the steps of:
dispersing acicular gamma-$Fe_2O_3$ particles having a particle size of 0.1 to 0.5 $\mu$m and having an acicular shape which has an axis ratio (long axis/short axis) of 5 to 20 in an aqueous solution which contains a ferrous salt in an amount of about 0.05 mol or more in respect of one mol of gamma-$Fe_2O_3$, a cobalt salt and an alkali in an amount of one equivalent or more in respect of the sum of the metal salts;
heating the resulting mixture of the dispersing step at a temperature higher than room temperature up to the boiling point of the mixture under such a condition that the divalent iron contained in said mixture is substantially not oxidized and in such a manner that a large amount of divalent iron is present in a surface region of the particles and that cobalt is predominantly incorporated into the outermost region of said particles in an amount of 0.5 to 10% by weight or more based on a weight of total metal atoms contained in said particles to thereby obtain cobalt-containing acicular iron oxide magnetic particles having a ratio of divalent iron and trivalent iron ($Fe^{2+}/Fe^{3+}$) of about 0.074 to 0.101; and
filtering the obtained cobalt-containing iron oxide magnetic particles out of said mixture.

12. Cobalt-containing iron oxide magnetic particles prepared by the process of claim 11.

13. A method for preparing cobalt-containing iron oxide magnetic particles according to claim 11, wherein the ferrous atom contained in the magnetic particles in the step of heating is in an amount of 10% to 20% by weight based on the weight of the total metal atoms contained in the particles.

14. A method according to claim 1, 6, 8, 11, wherein the starting acicular gamma-$Fe_2O_3$ particles have a $Fe^{2+}/Fe^{3+}$ ratio of less than 0.02.

15. Cobalt-containing iron oxide magnetic particles prepared by a process which comprises the steps of:
reducing acicular gamma-$Fe_2O_3$ particles to effect acicular iron oxide particles having a ratio of $Fe^{2+}/Fe^{3+}$ of about 0.074 to 0.101;
dispersing the resulting iron oxide particles from the step of reducing into an aqueous solution containing a cobalt salt and an alkali of at least one equivalent to the cobalt salt;
heating the resulting mixture from the step of dispersing under conditons wherein the divalent iron is substantially not oxidized, whereby cobalt is predominantly incorporated into the outermost layer of the acicular iron oxide particles in an amount of at least 0.2% by weight based on the weight of the total metal atoms contained in the particles; and
filtering the thus obtained cobalt-containinfg particles from the step of heating out of the mixture.

16. A magnetic tape comprising a layer of magnetic composition carried on a plastic substrate film, the magnetic composition comprising a plastic resin, and cobalt-containing iron oxide magnetic particles according to claim 15, said magnetic particles being included in said magnetic composition layer so that the resulting magnetic tape exhibits a surface electrical resistance of $10^8$ to $10^9 \Omega \cdot cm$ and exhibits a print-through effect of 62.0 to 63.0 dB.

17. A method of preparing a magnetic tape comprising the steps of coating a magnetic composition on a plastic substrate film, the magnetic composition comprising a plastic resin, a solvent and cobalt-containing iron oxide magnetic particles according to claim 15, said magnetic particles being included so that the magnetic tape exhibits a surface electrical resistance of $10^8$ to $10^9 \Omega \cdot cm$ and exhibits a print-through effect of 62.0 to 63.0 dB.

18. Cobalt-containing iron oxide particles according to claim 15 having a coercive force of between 550 and 740 oersteds.

19. Cobalt-containing iron oxide particles according to claim 15 having a coercive force of between 610 and 740 oesteds.

20. A magnetic tape comprising a layer of magnetic composition carried on a plastic substrate film, the magnetic composition comprising a plastic resin, and cobalt-containing iron oxide magnetic particles according to claim 15, said magnetic particles being included in said magnetic composition layer so that the resulting magnetic tape exhibits a surface electrical resistance of $10^8$ to $10^9 \Omega \cdot cm$.

21. The particles of claim 15, wherein the coercive force of the cobalt-containing particles is increased to between 610 and 740 oersteds.

22. Cobalt-containing iron oxide magnetic particles prepared by a process which comprises the steps of:
reducing acicular gamma-$Fe_2O_3$ particles which have an $Fe^{2+}/Fe^{3+}$ ratio which is almost zero to produce acicular iron oxide particles having a ratio of $Fe^{2+}/Fe^{3+}$ of about 0.074 to 0.101;
dispersing the resulting iron oxide particles from the step of reducing into an aqueous solution containing a cobalt salt and an alkali of at least one equivalent to the cobalt salt;
heating the resulting mixture from the step of dispersing at a temperature up to the boiling point of the mixture and under conditions wherein the divalent iron is substantially not oxidized, whereby cobalt is predominantly incorporated into the outermost layer of the acicular iron oxide particles in an amount of at least 0.2% by weight based on the weight of the total metal atoms contained in the particles; and
filtering the thus obtained cobalt-containing particles from the step of heating out of the mixture.

* * * * *

UNITED STATES PATENT AND TRADEMARK OFFICE
CERTIFICATE OF CORRECTION

PATENT NO. : 4,857,417

DATED : Aug. 15, 1989

INVENTOR(S) : Susumu KITAOKA et al.

It is certified that error appears in the above-identified patent and that said Letters Patent is hereby corrected as shown below:

Title page:

After "[73] Assignee" insert

--[*] Notice: The portion of the term of this patent subsequent to May 3, 2005 has been disclaimed.--.

Signed and Sealed this

Twenty-fifth Day of December, 1990

Attest:

HARRY F. MANBECK, JR.

*Attesting Officer*     *Commissioner of Patents and Trademarks*